United States Patent [19]
Eller et al.

[11] Patent Number: 6,027,077
[45] Date of Patent: Feb. 22, 2000

[54] SPACECRAFT WITH ALL-CRYOGENIC ELECTRONICS

[76] Inventors: Howard S. Eller, 2713 Robinson St., Redondo Beach, Calif. 90278; Ramon Coronel, 4821 Carmelynn St., Torrance, Calif. 90503; John W. Spargo, 2013 Nelson Ave. Apt. 4, Redondo Beach, Calif. 90278; Larry R. Eaton, 5332 Kenilworth, Huntington Beach, Calif. 92649; Andrew D. Smith, 2419 Unit A Carnegie Ln., Redondo Beach, Calif. 90278

[21] Appl. No.: 09/123,135

[22] Filed: Jul. 27, 1998

[51] Int. Cl.[7] .................................................. B64G 1/10
[52] U.S. Cl. ...................................... 244/173; 244/158 R
[58] Field of Search ............................... 244/158 R, 173; 505/163; 307/9.1

[56] References Cited

U.S. PATENT DOCUMENTS

| | | | |
|---|---|---|---|
| 4,771,971 | 9/1988 | Ludwig et al. | 244/158 R |
| 5,086,999 | 2/1992 | Mullen | 244/158 R |
| 5,518,209 | 5/1996 | Chicoine et al. | 244/158 R |
| 5,552,372 | 9/1996 | Ackermann et al. | 505/163 |

*Primary Examiner*—Robert P. Swiatek
*Attorney, Agent, or Firm*—Michael S. Yatsko

[57] ABSTRACT

A spacecraft (10) having a cryogenic cooler (24) that maintains different temperatures in thermally insulated and nested enclosures (26, 28, 12). In the coldest enclosure (26), which is maintained, for example, approximately 10° K, low-temperature superconducting (LTS) processors (32, 34) perform bus and payload processing functions at very high speed. The next-coldest enclosure (28) is maintained at approximately 77° K and houses high-temperature superconducting (HTS) electronic modules, such as for power regulation and distribution (40) and a payload sensor processing module (38). The third of the enclosures (12) is maintained at approximately 300° K and houses other modules operating at room temperature, including a transponder (44), power control (46), energy storage (48), a propulsion subsystem (22), a downlink data processing module (49) and the cryogenic cooler (24) itself. Thermal functions of the spacecraft are effectively centralized in the cryogenic cooler (24) and the bus and payload functions of the spacecraft are provided very efficiently in a small, compact an potentially low-cost configuration.

13 Claims, 1 Drawing Sheet

SPACECRAFT WITH ALL-CRYOGENIC ELECTRONICS

BACKGROUND OF THE INVENTION

This invention relates generally to autonomous spacecraft and, more specifically, to orbiting satellites with high data processing and throughput capabilities. In both commercial and government satellite applications, there is a significant trend toward higher ground data processing and satellite data throughput rates. Processing rates measured in billions ($10^9$) of floating-point operations per second (referred to as gigaflops), or even measured in multiples of $10^{12}$ floating-point operations per second (teraflops), are required or proposed for some satellite applications. To keep pace with this emerging trend, there is a need for space-based processors capable of handling massive data throughput and processing requirements.

In a conventional spacecraft implementation, these processors would require very large power levels, and would have correspondingly large power dissipation needs. Therefore, conventional satellite systems would need to be larger and more complex to handle very high processing loads. Accordingly, it would be highly desirable to provide an alternative to conventional satellite design, to achieve the required high throughput processing rates without the accompanying disadvantages of increased size and complexity. The present invention achieves this goal, as will become apparent from the following summary.

SUMMARY OF THE INVENTION

The present invention resides in a spacecraft in which practically all of the electronics and power modules are maintained at one of a plurality of low temperature levels to provide highly efficient operation. Briefly, and in general terms, the spacecraft of the invention comprises a cryogenic cooler; at least two cooled enclosures maintained at different temperature levels by the cryogenic cooler; at least one low-temperature superconducting (LTS) processor housed in one of the cooled enclosures, for handling spacecraft electronic processing functions; and at least one high-temperature superconducting (HTS) electronics module housed in another of the cooled enclosures, for handling other spacecraft functions that are best performed at low temperatures including supercooled electronics power regulation and distribution.

More specifically, the spacecraft may further comprise a plurality of additional modules housed in a third of the cooled enclosures and maintained at a temperature close to room temperature. These modules may include a transponder for processing telemetry, tracking and command signals, and a power control and energy storage subsystem. The modules housed in the third cooled enclosure further include a propulsion subsystem, and a downlink processing module, for transmitting data from the LTS processor to a downlink antenna. In the illustrative embodiment of the invention, the cryogenic cooler itself is also housed in the third of the cooled enclosures.

Alternatively, the cryogenic spacecraft may be defined as comprising first, second and third thermally insulated enclosures, wherein the first enclosure is contained within the second enclosure and the second enclosure is contained within the third enclosure; a cryogenic cooler for maintaining the first, second and third enclosures at different temperature levels; at least one low-temperature superconducting (LTS) processor housed in the first thermally insulated enclosure, for handling spacecraft electronic processing functions that are performed most efficiently at very low temperatures; at least one high-temperature superconducting (HTS) electronics module housed in the second thermally insulated enclosure, for handling other spacecraft functions that are best performed at low temperatures but higher than those in the first enclosure, including a supercooled electronics power regulation and distribution module; and a plurality of additional modules housed in the third thermally insulated enclosure, which is maintained at a temperature close to room temperature, including a transponder module, a power control and energy storage subsystem and a propulsion subsystem.

Additional components of the spacecraft include a sensor antenna for performing spacecraft payload functions; a sensor processing module housed within the second thermally insulated enclosure and coupled to the sensor antenna and to one of the LTS processors housed in the first thermally insulated enclosure; a payload data downlink antenna; and a downlink data processor housed in the third thermally insulated enclosure and coupled to the downlink antenna and to one of the LTS processors housed in the first thermally insulated enclosure. The spacecraft may also comprise a telemetry, tracking and command antenna coupled to the transponder; and a solar array coupled to the power control and energy storage subsystem. In the illustrative embodiment of the invention, the first, second and third thermally insulated enclosures are maintained at temperatures of approximately 10° K (Kelvin), 77° K and 300° K, respectively.

It will be appreciated from the foregoing that the present invention represents a significant advance in the field of spacecraft design and operation. In particular, the invention provides a small, compact and highly efficient spacecraft in which thermal dissipation requirements of the components are centralized in the cryogenic cooler and all processing components operate at temperatures for which they are best suited. Other aspects and advantages of the invention will become apparent from the following more detailed description, taken in conjunction with the accompanying drawings.

DESCRIPTION OF THE PREFERRED EMBODIMENT

Figure 1:
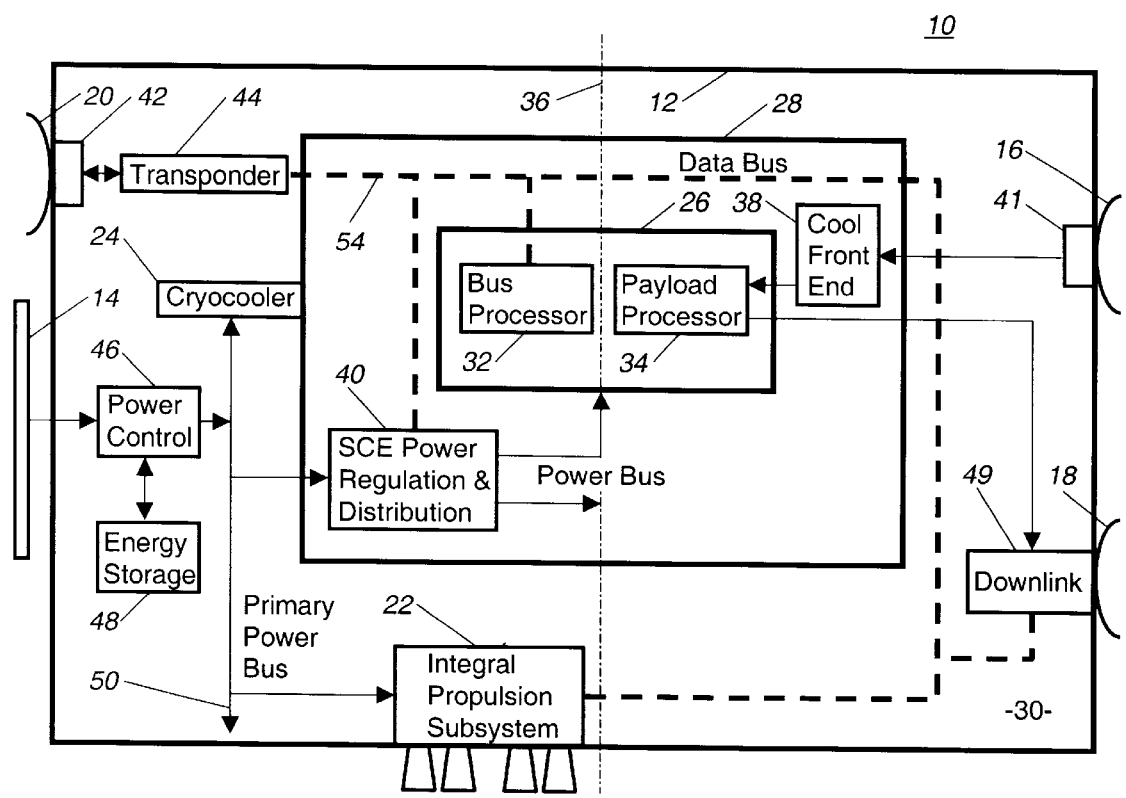
FIG. 1 is a block diagram of a spacecraft in accordance with the present invention.

As shown in the drawings for purposes of illustration, the present invention pertains to spacecraft construction. Because of a need to process data at increasingly faster rates, spacecraft electronics modules have become increasingly large, complex and costly. With higher data processing and throughput rates being proposed, there is a need for an alternative spacecraft construction that avoids problems inherent to large power loads and heat dissipation requirements.

In accordance with the present invention, practically all of the electronics modules of a spacecraft are superconducting electronics modules. FIG. 1 shows the spacecraft, indicated generally by reference numeral 10, with a main structure indicated by a rectangular outer enclosure 12, to which are appended a solar array 14, an antenna 16 for receiving or sensing signals, a downlink antenna 18 for transmitting data to a ground station (not shown), and a third antenna 20 for sending and receiving telemetry, tracking and command (TT&C) signals. Another partially external component is an integral propulsion system 22 used for orbit insertion or station keeping course adjustments.

An essential component of the present invention is a cryogenic cooler 24, which provides three levels of cooling for the other components within the outer enclosure 12. The greatest level of cooling is provided within an enclosure 26, which is cooled to a temperature of approximately 10° K (Kelvin). Surrounding the enclosure 26 is another enclosure 28, which is cooled by the cryogenic cooler 24 to a temperature of approximately 77° K. The volume 30 outside this second enclosure 28, and bounded by the outer enclosure 12, is cooled to "room temperature," which is approximately 300° K.

The inner enclosure 26 contains low-temperature superconducting (LTS) electronics modules, including, by way of example and not as a limitation, a bus processor 32 and a payload processor 34. In this illustrative embodiment of the invention, the conventional distinction between bus and payload components is maintained. In the past, a spacecraft was typically defined to include a "bus" for carrying a "payload," where the payload includes only those components that are specific to a mission to be performed by the spacecraft, and the bus includes everything else needed to deliver the payload to its destination and to maintain it while at the destination. In FIG. 1, every component to the right of a vertical line 36 through the spacecraft 10 is part of the payload. Components to the left of the line 36 are "bus" components. For purposes of the present invention, however, the distinction is not very important. A sufficiently powerful LTS processor in the coldest enclosure 26 would be capable of performing both bus and payload functions.

The middle enclosure 28 houses various electronic components that employ so-called high-temperature superconducting (HTS) electronics. These components include a cool "front end" module 38 that provides processing for sensor signal from the sensor antenna 16, which may, for example, be an infrared sensor. Also housed within the middle enclosure 28 is a superconducting electronics (SCE) power regulation and distribution module 40, which provides regulated electric power for the processors 32 and 34, as well as for components within the middle enclosure. If desired, the processors 32, 34 may be housed in the middle enclosure 28, and the modules 38, 40 placed in the inner enclosure 26.

Components within the room temperature volume 30 include antenna gimbals 41 and 42 for the antennas 16 and 20, respectively, a transponder 44 coupled to the TT&C up/downlink antenna 20, a power control module 46, an energy storage module 48, the integral propulsion subsystem 22, downlink electronics 49 associated with the downlink antenna 18, and the cryogenic cooler 24 itself.

Power from the solar array 14 and energy storage module 48 is distributed by the power control module 46 through a power bus 50. By far the largest share of power is distributed in unregulated form to the cryogenic cooler 24. Smaller amounts are distributed to the propulsion subsystem 22 and, although no connections are shown, to the antenna gimbals 41 and 42. Power must also be supplied to the downlink electronics 49 and the transponder 44.

The SCE power regulation and distribution module 40 provides relatively "clean" power, free of transients and voltage fluctuations, to the low-temperature processors 32 and 34, and to any other components within the middle and central enclosures 28 and 26. In the configuration as shown, the bulk of the spacecraft's power demands are accounted for by the cryogenic cooler 24. The cooled components have relatively low power requirements, and correspondingly low heat dissipation requirements. Therefore, a significant advantage of the invention is that both power consumption and heat dissipation needs are effectively centralized by use of the cryogenic cooler 24. In conventional spacecraft design, heat dissipation is treated as a local problem and each component must provide for its own needs in this regard.

A data bus 54 provides for the transfer of data to and from components in all three cooled enclosed volumes. Use of the bus 54, instead of multiple conducting wires, minimizes heat transfer across cooled enclosure boundaries.

The cryogenic cooler 24, or "cryocooler," operates on well known principles and may, for example, be of the same general type as described in U.S. Pat. No. 5,107,683 issued to Chan et al. Although cryogenic coolers in general have a very low efficiency, the low temperatures they generate allow electronics modules to operate at high speeds and without dissipating much heat. The other components of the illustrative spacecraft are conventional, including those using LTS and HTS electronics.

The cryogenic spacecraft in accordance with the invention not only provides high processing and throughput capabilities, but does so in a very compact and light weight structure that also has a low part count and a potentially low cost. Moreover, the spacecraft of the invention is easily adaptable to a variety of missions without redesign, except at a software level.

It will be appreciated from the foregoing that the present invention represents a significant advance in the field of spacecraft design. In particular, the invention provides a novel spacecraft structure using cryogenically cooled electronics for most of its functions. It will also be appreciated that, although an embodiment of the invention has been described in detail for purposes of illustration, various modifications may be made without departing from the spirit and scope of the invention. Accordingly, the invention should not be limited except as by the appended claims.

What is claimed is:

1. A cryogenic spacecraft, comprising:
   a cryogenic cooler;
   at least two cooled enclosures maintained at different temperature levels by the cryogenic cooler;
   at least one low-temperature superconducting (LTS) component housed in one of the cooled enclosures, for handling spacecraft electronic processing functions; and
   at least one high-temperature superconducting (HTS) component housed in another of the cooled enclosures, for handling other spacecraft functions that are best performed at low temperatures.

2. A cryogenic spacecraft as defined in claim 1, and further comprising:
   a plurality of additional modules housed in a third of the cooled enclosures and maintained at a temperature close to room temperature.

3. A cryogenic spacecraft as defined in claim 2, wherein the modules housed in the third cooled enclosure include a transponder for processing telemetry, tracking and command signals, and a power control and energy storage subsystem.

4. A cryogenic spacecraft as defined in claim 3, wherein the modules housed in the third cooled enclosure further include a propulsion subsystem.

5. A cryogenic spacecraft as defined in claim 4, wherein the modules housed in the third cooled enclosure further include a downlink processing module, for transmitting data from the LTS processor to a downlink antenna.

6. A cryogenic spacecraft as defined in claim 2, wherein the cryogenic cooler is also housed in the third of the cooled enclosures.

7. A spacecraft as defined in claim 1, wherein the LTS component is a processor.

8. A spacecraft as defined in claim 1, wherein the HTS component comprises an electronics module including a supercooled electronics power regulation and distribution module.

9. A cryogenic spacecraft, comprising:

first, second and third thermally insulated enclosures, wherein the first enclosure is contained within the second enclosure and the second enclosure is contained within the third enclosure;

a cryogenic cooler for maintaining the first, second and third enclosures at different temperature levels;

at least one low-temperature superconducting (LTS) processor housed in the first thermally insulated enclosure, for handling spacecraft electronic processing functions that are performed most efficiently at very low temperatures;

at least one high-temperature superconducting (HTS) electronics module, including a supercooled electronics power regulation and distribution module, housed in the second thermally insulated enclosure, for handling other spacecraft functions that are best performed at low temperatures but higher than those in the first enclosure; and a plurality of additional modules housed in the third thermally insulated enclosure, which is maintained at a temperature close to room temperature, including a transponder module, a power control and energy storage subsystem and a propulsion subsystem.

10. A cryogenic spacecraft as defined in claim 9, and further comprising:

a sensor antenna for performing spacecraft payload functions; and a sensor processing module housed within the second thermally insulated enclosure, and coupled to the sensor antenna and to one of the LTS processors housed in the first thermally insulated enclosure.

11. A cryogenic spacecraft as defined in claim 9, and further comprising:

a payload data downlink antenna; and a downlink data processor housed in the third thermally insulated enclosure, and coupled to the downlink antenna and to one of the LTS processors housed in the first thermally insulated enclosure.

12. A cryogenic spacecraft as defined in claim 9, and further comprising:

a telemetry, tracking and command antenna coupled to the transponder; and a solar array coupled to the power control and energy storage subsystem.

13. A cryogenic spacecraft as defined in claim 9, wherein the first, second and third thermally insulated enclosures are maintained at temperatures of approximately 10° K (Kelvin), 77° K and 300° K, respectively.

* * * * *